(12) United States Patent
Xu et al.

(10) Patent No.: US 11,372,961 B2
(45) Date of Patent: Jun. 28, 2022

(54) METHOD AND DEVICE FOR ASSIGNING APPLICATION USAGE PERMISSION

(71) Applicants: Gree Electric Appliances (Wuhan) Co., Ltd, Hubei (CN); Gree Electric Appliances, Inc. of Zhuhai, Guangdong (CN)

(72) Inventors: Pengfei Xu, Guangdong (CN); Ping Yang, Guangdong (CN)

(73) Assignee: Gree Electric Appliances (Wuhan) Co., Ltd, Wuhan (CN)

( * ) Notice: Subject to any disclaimer, the term of this patent is extended or adjusted under 35 U.S.C. 154(b) by 202 days.

(21) Appl. No.: 16/621,346

(22) PCT Filed: Dec. 22, 2017

(86) PCT No.: PCT/CN2017/117907
§ 371 (c)(1),
(2) Date: Dec. 11, 2019

(87) PCT Pub. No.: WO2018/233255
PCT Pub. Date: Dec. 27, 2018

(65) Prior Publication Data
US 2020/0167461 A1 May 28, 2020

(30) Foreign Application Priority Data
Jun. 19, 2017 (CN) .......................... 201710463886.7

(51) Int. Cl.
*G06F 16/51* (2019.01)
*G06F 21/45* (2013.01)
*G06F 21/36* (2013.01)

(52) U.S. Cl.
CPC .............. *G06F 21/36* (2013.01); *G06F 16/51* (2019.01); *G06F 21/45* (2013.01)

(58) Field of Classification Search
CPC .......... G06F 21/36; G06F 21/45; G06F 21/32; G06F 16/51; G06F 2221/2141; G06F 2221/2149; H04M 1/725; H04M 1/72463
See application file for complete search history.

(56) References Cited

U.S. PATENT DOCUMENTS 9,286,482 B1 * 3/2016 Dumont ................. G06F 21/32
10,049,515 B2 * 8/2018 Greene .............. G06K 9/00295
(Continued)

FOREIGN PATENT DOCUMENTS

| CN | 101833624 A | 9/2010 |
| CN | 103310137 A | 9/2013 |

(Continued)

OTHER PUBLICATIONS

International Search Report, dated Mar. 22, 2018, in International application No. PCT/CN2017/117907, filed on Dec. 22, 2017.
(Continued)

*Primary Examiner* — Carl G Colin
*Assistant Examiner* — Hany S. Gadalla
(74) *Attorney, Agent, or Firm* — McAndrews, Held & Malloy, Ltd.

(57) ABSTRACT

The present disclosure related to a method and device for assigning application usage permission. The method includes: collecting a first image of a current first user, and when it is recognized that a target application is enabled, judging whether the first image matches a target image corresponding to the target application (S101); if yes, assigning all usage permissions of the target application to the current first user (S102); if not, judging whether there is a first stranger image matching the first image successfully (S103); if yes, assigning a corresponding usage permission of the target application to the current first user according to a collection count corresponding to the first stranger image
(Continued)

and a usage permission corresponding to a collection count range threshold (S104); and if not, not assigning the usage permission of the target application to the current first user (S105).

16 Claims, 4 Drawing Sheets

(56) References Cited

U.S. PATENT DOCUMENTS

| | | |
|---|---|---|
| 2002/0191817 A1 | 12/2002 | Sato et al. |
| 2008/0028449 A1 | 1/2008 | Shigeeda et al. |
| 2013/0063581 A1* | 3/2013 | Komatsu ............ G06K 9/00288 348/77 |
| 2013/0273968 A1* | 10/2013 | Rhoads ................ H04W 4/50 455/556.1 |
| 2015/0049922 A1* | 2/2015 | Miller ................ H04W 12/068 382/118 |
| 2016/0217638 A1* | 7/2016 | Child .................. H04L 12/2827 |
| 2016/0292493 A1* | 10/2016 | Gao ..................... G06K 9/6215 |
| 2016/0359851 A1* | 12/2016 | Stuntebeck ............. G06F 21/32 |
| 2016/0371504 A1* | 12/2016 | Huang ................... G06F 21/31 |
| 2016/0381013 A1* | 12/2016 | Buscemi ................ H04L 63/10 726/4 |
| 2017/0255942 A1* | 9/2017 | Chandrasekaran ..... G06F 21/32 |
| 2018/0004924 A1* | 1/2018 | Tieu .................... G06F 21/6218 |
| 2018/0047230 A1* | 2/2018 | Nye ......................... G07C 9/37 |
| 2018/0061220 A1* | 3/2018 | Greene ................. G05B 15/02 |

FOREIGN PATENT DOCUMENTS

| | | |
|---|---|---|
| CN | 103995997 A | 8/2014 |
| CN | 104820829 A | 8/2015 |
| CN | 105184241 A | 12/2015 |
| CN | 105760746 A | 7/2016 |
| CN | 105893817 A | 8/2016 |
| CN | 105897430 A | 8/2016 |

OTHER PUBLICATIONS

Chinese first examination report dated Jan. 3, 2021 in Chinese application No. 201710463886.7 (7 pages).

* cited by examiner

METHOD AND DEVICE FOR ASSIGNING APPLICATION USAGE PERMISSION

This application is a 371 of International Patent Application No. PCT/CN2017/117907, filed Dec. 22, 2017, which claims benefit of Chinese Patent Application No. 201710463886.7, filed to the China Patent Office on Jun. 19, 2016, entitled "Application Usage Permission Assignment Method and Device," contents of both of which are hereby incorporated by reference in their entirety.

TECHNICAL FIELD

The present disclosure relates to the technical field of mobile terminals, and particularly relates to a method and device for assigning application usage permission.

BACKGROUND

As a communication tool, a mobile terminal has become an indispensable part of people's daily lives. The user's life is usually recorded in the mobile terminal, especially the contact with neighboring friends.

The existing mobile terminal usually protects the information of a primary user to which the mobile terminal belongs by using a security locking, a security may be set for the mobile terminal, or a security may also be set for some applications on the mobile terminal. Regardless of whether it is for a mobile terminal or for an application in a mobile terminal, a digital password is usually used for the security locking. As long as a user can unlock successfully, the user can obtain all usage permissions of the unlocked application, and then perform any operation. For example, information of contacts in a phone application in a mobile terminal is viewed, changed and deleted.

In addition to a primary user to which the mobile terminal belongs, the user who can perform unlocking successfully may be a relative, a friend and the like of the primary user, and they have different degrees of intimacy with the primary user. In general, the primary user tells a correct unlock password, but the usage permissions to be assigned to each other user are not the same. However, as long as the unlocking is successful, the usage permissions of each other user are the same as those of the primary user, which may cause the privacy of the primary user to be leaked. For example, the primary user only wants to assign a permission of making a call to a friend, but when the friend uses the mobile terminal of the primary user to make a call, he can also view the call record and view, change and delete information of contacts, etc., which leads to leakage of the privacy of the primary user.

It is also possible that a stranger can perform unlocking successfully, for example, the mobile terminal is stolen, and the primary user does not want the stranger to steal any information in the phone application, but the existing phone application protection method does not solve the problem.

In summary, although the existing mobile terminal can be securely locked, or the application on the mobile terminal is securely locked, once the unlocking is successful, the usage permissions of each user who performs unlocking successfully are the same, which seriously affects the privacy of the primary user of the mobile terminal and brings a poor user experience to the primary user.

SUMMARY

Some embodiments of the present disclosure discloses a method for assigning application usage permission, which includes:

a first image of a current first user is collected, and when it is recognized that a target application is enabled, it is judged whether the collected first image matches a pre-stored target image corresponding to the target application;

if yes, all usage permissions of the target application are assigned to the current first user;

if not, it is judged whether there is a first stranger image matching the first image successfully, if yes, a corresponding usage permission of the target application is assigned to the current first user according to a stored collection count corresponding to the first stranger image and a usage permission corresponding to a preset collection count range threshold, and if not, the usage permission of the target application is not assigned to the current first user.

According to some example embodiments, before collecting the first image of the current first user, the method further includes:

it is judged whether a mobile terminal is unlocked successfully, and if yes, the subsequent steps are performed.

According to some example embodiments, the method further includes:

an image entry request for the target application is received.

A second image of a current second user is collected, and it is judged whether the target image corresponding to the target application is stored.

If not, the second image is stored as the target image corresponding to the target application.

If yes, it is judged whether a collected second image matches the stored target image corresponding to the target application, if yes, the target image is updated according, to the collected second image, and if not, prompt information having stored the target image corresponding to the target application is output.

According to some example embodiments, the step of assigning the corresponding usage permission of the target application to the current first user according to the collection count corresponding to the first stranger image and the usage permission corresponding to a collection count range threshold includes:

it is judged whether the collection count is less than a preset first collection count threshold.

If yes, the usage permission of the target application is not assigned to the current first user.

If not, it is judged whether the collection count is greater than a preset second collection count threshold, if yes, a first partial usage permission of the target application is assigned to the current first user, and if not, a second partial usage permission of the target application is assigned to the current first user, wherein the first partial usage permission includes the second partial usage permission, and the first collection count threshold is less than the second collection count threshold.

According to some example embodiments, if it is determined that there is not a first stranger image matching the first image successfully, the method further includes:

the first image is stored as a second stranger image, and a collection count of the second stranger image is stored.

According to some example embodiments, if it is determined that there is a first stranger image matching the first image successfully, the method further includes:

a collection count of the stored first stranger image is updated.

According to some example embodiments, before updating the collection count of the stored first stranger image, the method further includes:

it is judged whether a time interval between a first time for currently collecting the first image and a second time stored for the first stranger image is greater than a preset time threshold, if yes, the subsequent steps are performed, and the second time is updated according to a current time, wherein the second time is time for previously updating the collection count of the first stranger image.

Some embodiments of the present disclosure discloses a device for assigning application usage permission, which includes:

a collection element, configured to collect a first image of a current first user;

a first judgment element, configured to judge, when it is recognized that a target application is enabled, whether the collected first image matches a pre-stored target image corresponding to the target application;

an assignment element, configured to assign, when the judgment result of the first judgment element is yes, all usage permissions of the target application to the current first user; and a second judgment element, configured to judge, when the judgment result of the first judgment element is no, whether there is a first stranger image matching the first image.

The assignment element is further configured to assign, when the judgment result of the second judgment element is yes, a corresponding usage permission of the target application to the current first user according to a stored collection count corresponding to the first stranger image and a usage permission corresponding to a preset collection count range threshold, and not assign, when the judgment result of the second judgment element is no, the usage permission of the target application to the current first user.

According to some example embodiments, the device further includes:

a third judgment element, configured to judge whether a mobile terminal is unlocked successfully, and trigger, if the judgment result of the third judgment element is yes, the collection element.

According to some example embodiments, the device further includes:

a receiving and storing element, configured to receive an image entry request for the target application, collect a second image of a current second user, judge whether the target image corresponding to the target application is stored, if not, store the second image as the target image corresponding to the target application, if yes, judge whether a collected second image matches the stored target image corresponding to the target application, if yes, update the target image according to the collected second image, and if not, output prompt information having stored the target image corresponding to the target application.

According to some example embodiments, the assignment element is configured to judge whether the collection count is less than a preset first collection count threshold, if yes, not assign a usage permission of the target application to the current first user, if not, judge whether the collection count is greater than a preset second collection count threshold, if yes, assign a first partial usage permission of the target application to the current first user, and if not, assign a second partial usage permission of the target application to the current first user, wherein the first partial usage permission includes the second partial usage permission, and the first collection count threshold is less than the second collection count threshold.

According to some example embodiments, the device further includes:

a storage element, configured to store, when the judgment result of the second judgment element is no, the first image as a second stranger image, and store a collection count of the second stranger image.

According to some example embodiments, the device further includes:

an update element, configured to update, when the judgment result of the second judgment element is yes, the collection count of the stored first stranger image.

According to some example embodiments, the device further includes:

a fourth judgment element, configured to judge whether a time interval between a first time for currently collecting the first image and a second time stored for the first stranger image is greater than a preset time threshold, trigger the update element if the judgment result of the fourth judgment element is yes, and update the second time according to a current time, wherein the second time is time for previously updating the collection count of the first stranger image.

Some embodiments of the present disclosure discloses a storage medium, which includes a stored program, wherein when the program is running, a device where the storage medium is located may be controlled to perform the above method for assigning application usage permission.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings in the following description are only some embodiments of the present disclosure, and other drawings can be obtained from those skilled in the art according to these drawings without any creative work.

DETAILED DESCRIPTION OF THE EMBODIMENTS

In order to achieve the effects of assigning different usage permissions of the target application to different users, avoiding the leakage of the privacy of a primary user, and improving the use experience of the primary user, the embodiments of the present disclosure provide a method and device for assigning application usage permission.

The technical solutions in the embodiments of the present disclosure are clearly and completely described in the following with reference to the drawings in the embodiments of the present disclosure. It is apparent that the described embodiments are merely a part of the embodiments of the present disclosure, but not all of the embodiments. All other embodiments obtained by those of ordinary skill in the art based on the embodiments of the present disclosure without creative efforts fall within the scope of protection of the present disclosure.

Embodiment 1

Figure 1:
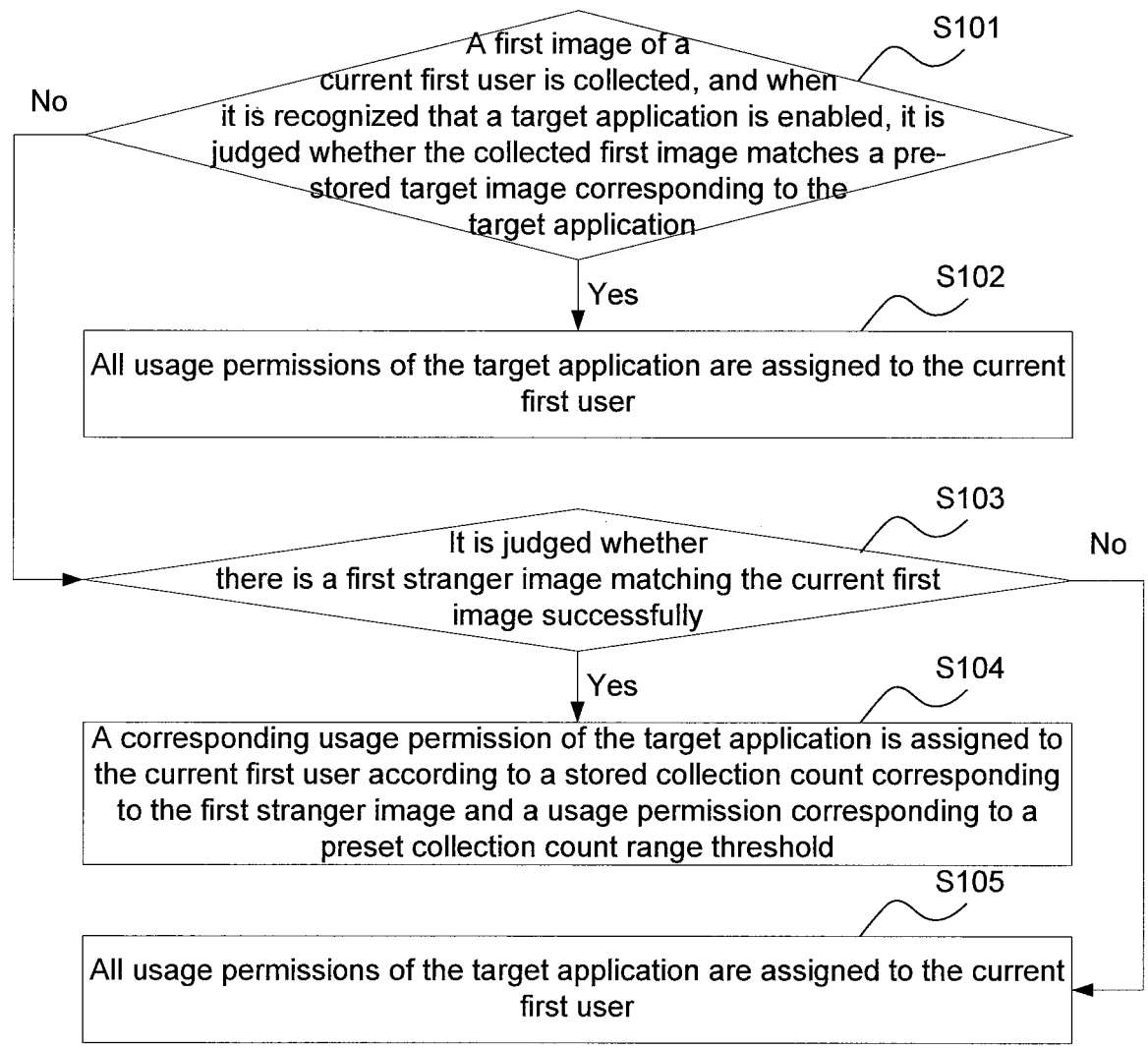
FIG. 1 is a flowchart of an assignment process of an application usage permission according to Embodiment 1 of the present disclosure.

FIG. 1 is a flowchart of an assignment process of an application usage permission according to Embodiment 1 of the present disclosure. The process includes the following steps:

S101: A first image of a current first user is collected, and when it is recognized that a target application is enabled, it is judged whether the collected first image matches a pre-stored target image corresponding to the target application. If yes, S102 is performed, and if not, S103 is performed.

The method for assigning application usage permission provided by some embodiments of the present disclosure is applied to a mobile terminal, such as a mobile phone, a notebook computer or other mobile devices.

For each application in the mobile terminal, it may be used as a target application, and usage permissions of the application are determined according to the following description. For example, the application may be a phone application, an information application, or the like.

A target image corresponding to the target application is stored in the mobile terminal, and the target image corresponding to the target application may be a head portrait of a primary user of the mobile terminal. When the mobile terminal collects a first image of a current first user, it may be collected when it is recognized that the target application is enabled. When the first image is collected, the mobile terminal may open a front camera to collect the first user.

In addition, when collecting the first image of the current first user, image collection may be performed at a preset first time interval, and the first image for performing the permission assignment of the target application is stored in the mobile terminal. After collecting an image, it is judged whether the collected image matches the currently stored first image, if yes, the first image is stored, otherwise, the collected image is used to update the first image. The preset first time interval may be a relatively short time, for example, may be 20 seconds, or 1 minute, etc., so that when the target application is enabled, the first image adopted is an image of the first user currently operating. In addition, the first image may be stored for a long time or may be cleared after the mobile terminal is locked.

When it is recognized that a target application is enabled, it is judged whether the collected first image matches a pre-stored target image corresponding to the target application. The process of judging whether an image is matched is the related art, and the process is not described in some embodiments of the present disclosure.

S102: All usage permissions of the target application are assigned to the current first user.

If the first image matches the pre-stored target image corresponding to the target application, it indicates that the first user is the primary user of the mobile terminal, and all usage permissions of the target application are assigned to the first user. The target application may be, for example, a phone application, and the first user has all usage permissions of the phone application, and can perform any operation on the phone application, such as making a call, viewing a call record, and deleting or changing information of contacts.

S103: It is judged whether there is a first stranger image matching the first image successfully. If yes, S104 is performed, and if not, S105 is performed.

If the first image does not match the pre-stored target image corresponding to the target application, it indicates that the first user is not the primary user of the mobile terminal, and a corresponding usage permission of the target application may be assigned to the first user according to whether the mobile terminal collects a first stranger image matching the first image successfully and according to a collection count corresponding to the first stranger image.

The mobile terminal stores a stranger image library, and stores a collection count corresponding to each stranger image in the stranger image library and a usage permission corresponding to a collection count range threshold. The stranger image may be pre-stored by a user to the mobile terminal, and the user may configure the collection count for each stranger image, thereby ensuring that a corresponding usage permission of the user corresponding to the stranger image is determined according to a relationship between the user corresponding to each stranger image and the primary user.

When the first image does not match the pre-stored target image corresponding to the target application, the first image is matched with each stranger image in the pre-stored stranger image library to judge whether there is a first stranger image matching the first image successfully.

S104: A corresponding usage permission of the target application is assigned to the current first user according to a stored collection count corresponding to the first stranger image and a usage permission corresponding to a preset collection count range threshold.

If there is a first stranger image matching the first image successfully, it is considered that an image of the first user is pre-stored, and the first user may be considered as a person who has a certain relationship with the primary user such as a relative, a friend, or the like. The mobile terminal may assign a corresponding usage permission of the target application to the first user according to a stored collection count corresponding to the first stranger image and a usage permission corresponding to a preset collection count range threshold. Specifically, it may be judged whether the collection count is greater than a preset collection count threshold, if yes, a third partial usage permission of the target application is assigned to the first user, and if not, a fourth partial usage permission of the target application is assigned to the first user, wherein the third partial usage permission includes the fourth partial usage permission.

The target application may be, for example, a telephone application, the fourth partial usage permission may include a permission to make a call and a permission to view information of contacts, and the third partial usage permission may include a permission to make a call, a permission to view information of contacts, and a permission to view a call record.

It can be understood that: according to the familiarity of a relationship between the first user and the primary user, a corresponding usage permission of the target application is assigned to the first user; a larger collection count represents a closer relationship between the first user and the primary user, and more usage permissions are assigned to the first user; and a smaller collection count represents a remote relationship between the first user and the primary user, and fewer usage permissions are assigned to the first user.

S105: A usage permission of the target application is not assigned to the current first user.

If there is not a first stranger image matching the first image successfully, the first user may be considered to be in a stranger relationship with the primary user, and the usage permission of the target application is not assigned to the first user.

In the embodiments of the present disclosure, when the collected first image matches the target image corresponding to the target application successfully, all usage permissions of the target application are assigned to the first user, otherwise, a corresponding usage permission of the target application is assigned to the first user according to whether there is a first stranger image matching the first image successfully and according to a collection count corresponding to the first stranger image and a usage permission corresponding to a preset collection count range threshold, or the usage permission of the target application is not assigned to the first user. Therefore, the effect of assigning different usage permissions of the target application to different users is achieved, the leakage of the privacy of a primary user is avoided, and the use experience of the primary user is improved.

Embodiment 2

Under normal circumstances, when using a specific application of a mobile terminal, a user needs to ensure that the mobile terminal is unlocked. When the mobile terminal is locked and then unlocked, it is possible to replace the user, in order to avoid repeated collection and to timely collect an image of the user every time the user is replaced, a usage permission corresponding to the current user is further accurately determined. On the basis of the above embodiments, in some embodiments of the present disclosure, before collecting the first image of the current first user, the method further includes:

it is judged whether a mobile terminal is unlocked successfully, and if yes, the subsequent steps are performed.

In the embodiments of the present disclosure, the mobile terminal may identify whether it is successfully unlocked, and if yes, the first image of the current first user is collected. The mobile terminal collects the first image of the first user every time it determines that it has been successfully unlocked. When it is recognized that a target application is enabled, it is judged whether the first image matches a pre-stored target image corresponding to the target application, and the subsequent steps are performed according to the judgment result.

After the unlocking is successful, in order to ensure the accuracy of control, image collection may be performed according to a set second time interval, and it is judged whether a collected image matches the first image. If yes, the first image is stored continuously, otherwise, the first image is updated with the collected image. The set second time interval may be 5 minutes, or 10 minutes, and the like. In addition, the first image may be stored for a long time or may be cleared after the mobile terminal is locked. The first time interval is the same as or different from the second time interval.

Embodiment 3

Figure 2:
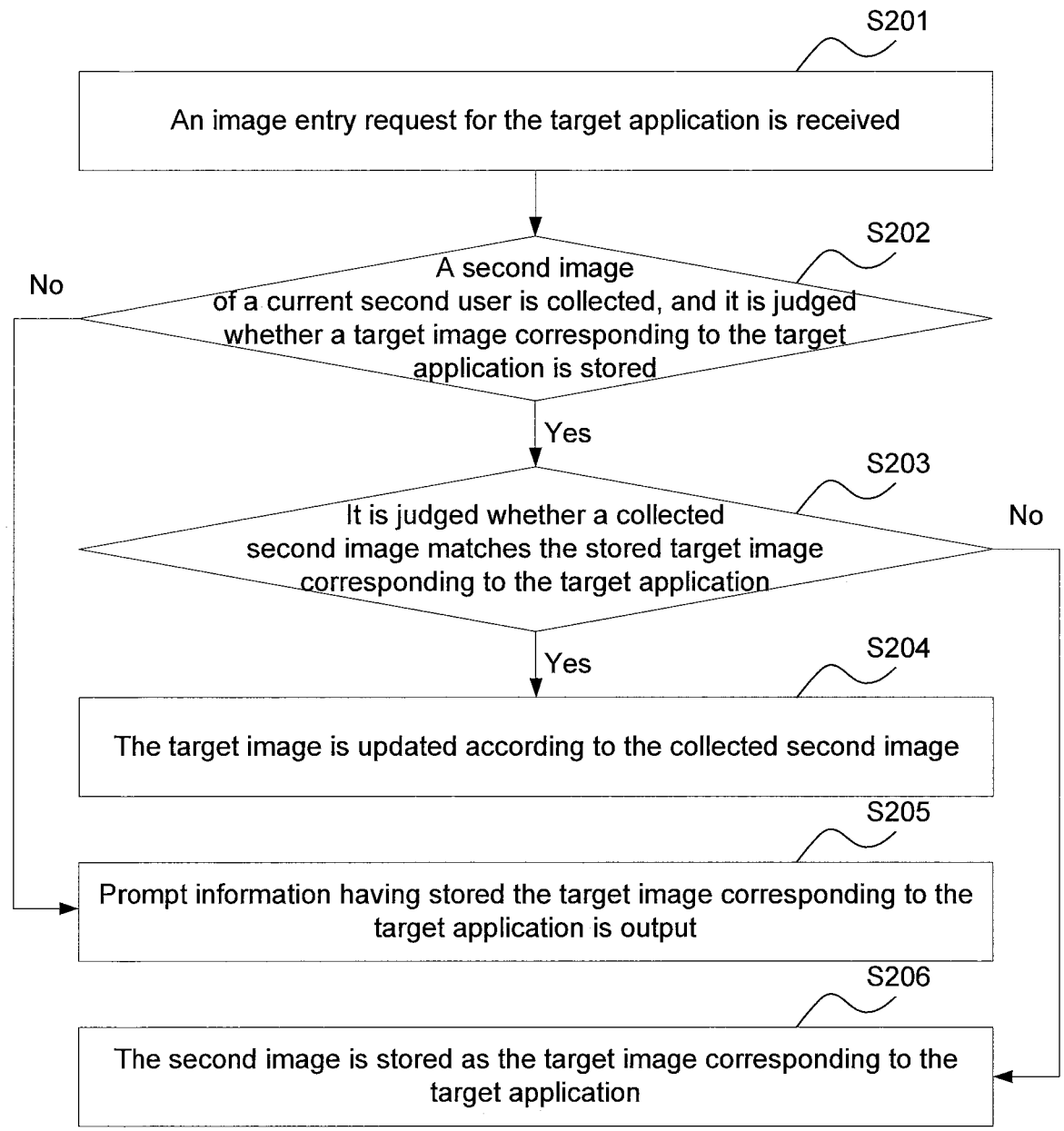
FIG. 2 is a flowchart of a process of determining a target image of a target application according to Embodiment 3 of the present disclosure.

A mobile terminal may store a target image corresponding to a target application. In order to further improve the user experience, on the basis of the above embodiments, FIG. 2 is a flowchart of a process of determining a target image of a target application according to Embodiment 3 of the present disclosure. The process includes the following steps:

S201: An image entry request for the target application is received.

S202: A second image of a current second user is collected, and it is judged whether a target image corresponding to the target application is stored. If yes, S203 is performed, and if not, S206 is performed.

S203: It is judged whether a collected second image matches the stored target image corresponding to the target application. If yes, S204 is performed, and if not, S205 is performed.

S204: The target image is updated according to the collected second image.

S205: Prompt information having stored the target image corresponding to the target application is output.

S206: The second image is stored as the target image corresponding to the target application.

In the embodiments of the present disclosure, in order to facilitate the subsequent assignment of the usage permissions, the target image of the target application may be stored or the target image of the target application may be updated. The user may perform an image entry operation on the target application on the mobile terminal. Specifically, the target application may be provided with an "Enter Image" button, or a "setting application" of the mobile terminal may be provided with an "Enter Image" button for the target application, and the user clicks on the "Enter Image" button to allow image entry for the target application.

During image entry, the image entry may be directly performed. For security reasons, the security of the image entry may be set. Specifically, the security may be set for the target application, or the security may be set for the "setting application", such as a password or a fingerprint. When an image is entered for the target application, the user needs to input a correct password before the image is entered. When the image is entered, the mobile terminal may open a front camera to collect an image of a second user.

When receiving the image entry request for the target application, the mobile terminal collects a second image of a current second user, and judges whether the target image corresponding to the target application has been stored. If the target image corresponding to the target application is not stored, a collected second image may be stored as the target image corresponding to the target application. If the target image corresponding to the target application has been stored, the collected second image is matched with the stored target image corresponding to the target application to judge whether the matching is successful.

If the collected second image matches the stored target image corresponding to the target application, it indicates that the second user is the primary user of the mobile terminal, the target image may be updated according to the collected second image, that is, the target image is updated to the collected second image.

If the collected second image does not match the stored target image corresponding to the target application, it indicates that the second user is not the primary user of the mobile terminal, the original target image remains unchanged, and prompt information having stored the target image corresponding to the target application is output.

Embodiment 4

When determining a usage permission of a first user, judgment may be performed according to only one collection count threshold. In order to more flexibly determine the usage permission of the first user, the judgment may also be performed according to multiple collection count thresholds. On the basis of the above embodiments, in some embodiments of the present disclosure, the step of assigning the corresponding usage permission of the target application to the current first user according to the collection count corresponding to the first stranger image and a usage permission corresponding to a collection count range threshold includes:

it is judged whether the collection count is less than a preset first collection count threshold;

if yes, the usage permission of the target application is not assigned to the first use;

if not, it is judged whether the collection count is greater than a preset second collection count threshold, if yes, a first partial usage permission of the target application is assigned to the current first user, and if not, a second partial usage permission of the target application is assigned to the current first user, wherein the first partial usage permission includes the second partial usage permission, and the first collection count threshold is less than the second collection count threshold.

In the embodiments of the present disclosure, the pre-stored collection count range threshold in the mobile terminal is a first collection count threshold and a second collection count threshold. The first collection count threshold is less than the second collection count threshold. Correspondingly, when the collection count is less than the first collection count threshold, the usage permission is not provided; when the collection count is greater than the second collection count threshold, a first usage permission is provided; and when the collection count is between the first collection count threshold and the second collection count threshold, a second partial usage permission is provided, wherein the first partial usage permission includes the second partial usage permission.

After the mobile terminal recognizes the collection count, it may be first judged whether the collection count is less than the preset first collection count threshold; if the collection count is less than the preset first collection count threshold, a usage permission of the target application is not assigned to the first user; if the collection count is not less than the preset first collection count threshold, it may be judged whether the collection count is greater than the preset second collection count threshold, and if the collection count is greater than the preset second collection count threshold, a first partial usage permission of the target application is assigned to the first user; and if the collection count is not greater than the preset second collection count threshold, it indicates that the collection count is between the first collection count threshold and the second collection count threshold, and a second partial usage permission of the target application is assigned to the first user.

The target application may be, for example, a telephone application, the second partial usage permission may include a permission to make a call, and the first partial usage permission may include a permission to make a call and a permission to view information of contacts.

When a corresponding usage permission of the target application is assigned to the first user according to the stored collection count corresponding to the first stranger image and a usage permission corresponding to the preset collection count range threshold, it may be first judged whether the collection count is greater than the preset second collection count threshold and then judged whether the collection count is less than the preset first collection count threshold, and it may be first judged whether the collection count is between the first collection count threshold and the second collection count threshold, and then judged whether the collection count is greater than the preset second collection count threshold or then judged whether the collection count is less than the preset first collection count threshold.

Although the mobile terminal collects an image of the first stranger, for the sake of security, when the first stranger image corresponds to a small collection count, the usage permission is not assigned to the first user.

Figure 3:
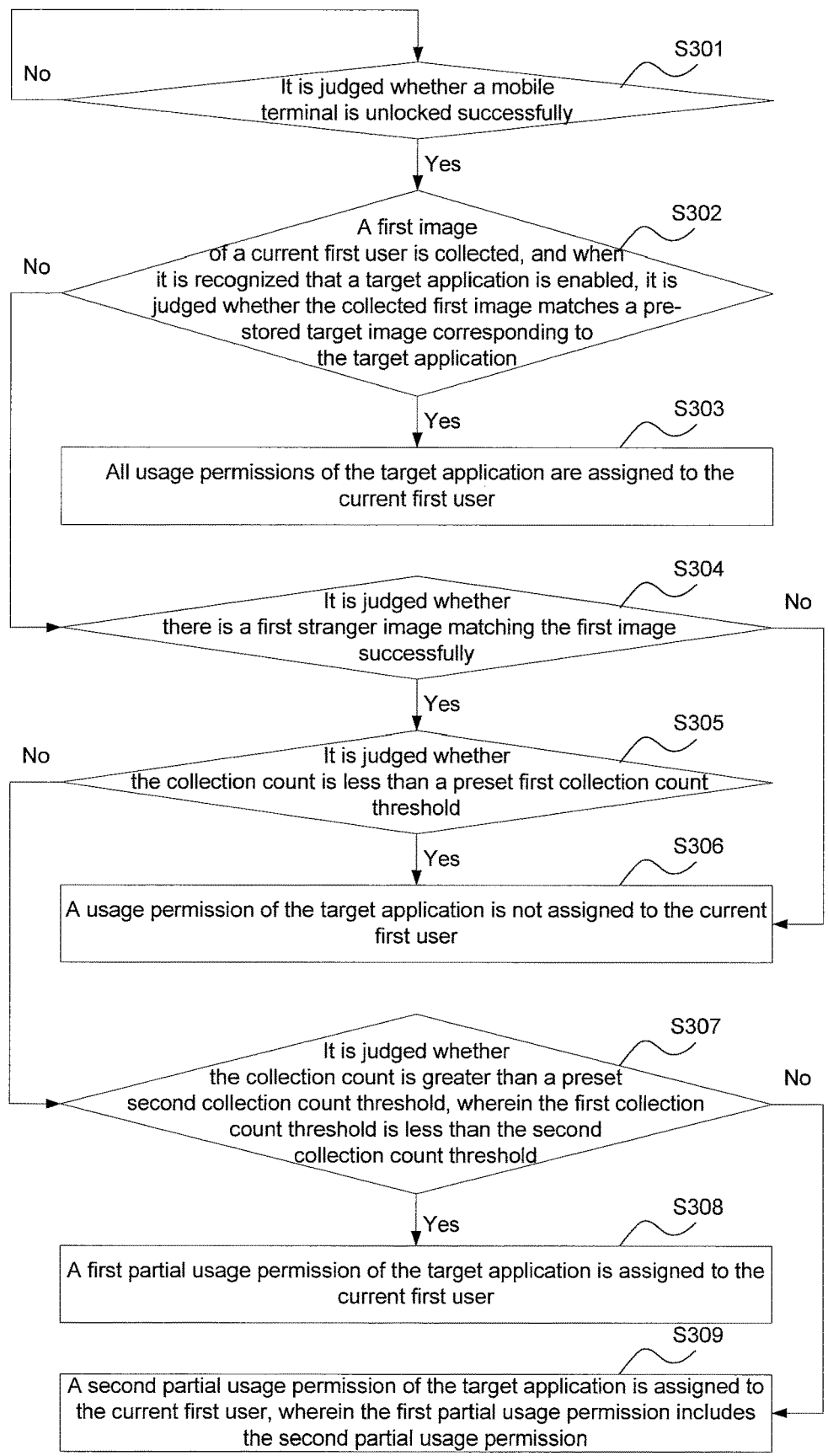
FIG. 3 is a flowchart of an assignment process of an application usage permission according to Embodiment 4 of the present disclosure.

FIG. 3 is a flowchart of an assignment process of an application usage permission according to Embodiment 4 of the present disclosure. The process includes the following steps:

S301: It is judged whether a mobile terminal is unlocked successfully, if yes, S302 is performed, and if not, S301 is performed.

S302: A first image of a current first user is collected, and when it is recognized that a target application is enabled, it is judged whether the collected first image matches a pre-stored target image corresponding to the target application. If yes, S303 is performed, and if not, S304 is performed.

S303: All usage permissions of the target application are assigned to the current first user.

S304: It is judged whether there is a first stranger image matching the first image successfully. If yes, S305 is performed, and if not, S306 is performed.

S305: It is judged whether the collection count is less than a preset first collection count threshold. If yes, S306 is performed, and if not, S307 is performed.

S306: A usage permission of the target application is not assigned to the current first user.

S307: It is judged whether the collection count is greater than a preset second collection count threshold, wherein the first collection count threshold is less than the second collection count threshold. If yes, S308 is performed, and if not, S309 is performed.

S308: A first partial usage permission of the target application is assigned to the current first user.

S309: A second partial usage permission of the target application is assigned to the current first user, wherein the first partial usage permission includes the second partial usage permission.

Embodiment 5

In order to facilitate the accurate assignment of usage permissions to a user in the future, in some embodiments of the present disclosure, if it is determined that there is not a first stranger image matching a first image successfully, the method further includes:

the first image is stored as a second stranger image, and a collection count of the second stranger image is stored.

The collected first image is stored as a second stranger image and added to a stranger image library, a collection count of the second stranger image is determined, generally the collection count is determined as 1, and the collection count of the second stranger image is stored.

If it is determined that there is a first stranger image matching the first image successfully, the method further includes:

A collection count of the stored first stranger image is updated.

The collection count corresponding to each stranger image stored in the mobile terminal may be configured by the user, or may be determined by the mobile terminal according to the result of each collection. In order to more accurately assign a usage permission corresponding to the target application to a current first user, the collection count of the stranger image may also be a collection count within a preset duration, wherein the preset duration may be one month, three months, 100 days and so on.

When the collection count of the stored first stranger image is updated, generally every time an image matching the image is collected, the collection count of the first stranger is increased by one. However, in order to more intelligently reflect the familiarity of a user from whom an image is collected and a primary user, in order to assign better usage permissions to different users, when updating the collection count, specifically, the collection count of the first stranger image may be updated according to an update manner corresponding to the collection count of the pre-stored first stranger image, wherein the update manner refers to: every time an image matching the first stranger image is collected, the collection count of the first stranger image is increased by a preset count.

The mobile terminal stores the update manner corresponding to the collection count of the stranger image for each stranger image, that is, every time an image matching the stranger image is collected, the collection count of the stranger image is increased by a preset count. For example, the update manner for a certain stranger image is that every time an image matching the image is collected, the collection count of this stranger image is increased by 2. The update manner for another stranger image is that every time an image matching the image is collected, the collection count of this stranger image is increased by 3.

When the collection count of the stored stranger image is updated, every time an image matching the first stranger image is collected, the collection count of the first stranger image may be updated by using the above update manner.

When the mobile terminal is stolen, the same user may frequently lock and unlock the mobile terminal. If an image matching the stranger image is collected once, the collection count of the stranger image is updated. The collection count of a stealer image is increased to a requirement for more use permissions of the target application in a short time. For the sake of safety, on the basis of the above embodiments, in some embodiments of the present disclosure, before updating the collection count of the stored first stranger image, the method further includes:

it is judged whether a time interval between a first time for currently collecting the first image and a second time stored for the first stranger image is greater than a preset time threshold, if yes, the subsequent steps are performed, and the second time is updated according to a current time, wherein the second time is time for previously updating the collection count of the first stranger image.

The mobile terminal stores the time corresponding to the update every time the collection count of the stranger image is updated. And a time threshold is also stored in the mobile terminal. When the mobile terminal collects a first image matching the first stranger image, a first time for collecting the first image is recognized, and a time interval between the first time and a second time is determined, wherein the second time is time for previously updating the first stranger image, it is judged whether the time interval is greater than a preset time threshold, if the time interval is greater than the preset time threshold, the collection count of the stored first stranger image is updated, and the second time is updated according to a current time, that is, the second time is updated to the current time.

If the time interval is not greater than the time threshold, the collection count of the stored first stranger image is not updated, and the original second time remains unchanged.

When the collection count of the stored first stranger image is updated, every time an image matching the image is collected, the collection count of the first stranger image may be increased by 1 or 2 or 3.

Figure 4:
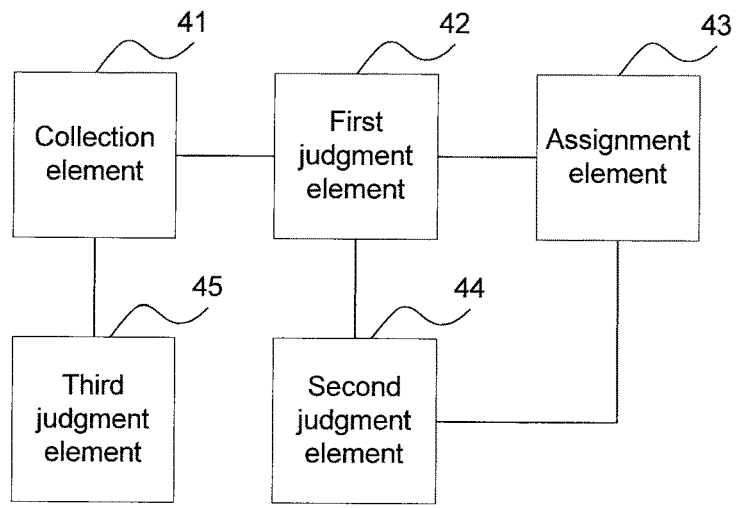
FIG. 4 is a schematic diagram of a device for assigning application usage permission according to some embodiments of the present disclosure.

FIG. 4 is a schematic diagram of a device for assigning application usage permission according to some embodiments of the present disclosure. The device includes a collection element 41, a first judgment element 42, an assignment element 43, and a second judgment element 44.

The collection element 41 is configured to collect a first image of a current first user.

The first judgment element 42 is configured to judge, when it is recognized that a target application is enabled, whether the collected first image matches a pre-stored target image corresponding to the target application.

The assignment element 43 is configured to assign, when the judgment result of the first judgment element 42 is yes, all usage permissions of the target application to the current first user.

The second judgment element 44 is configured to judge, when the judgment result of the first judgment element 42 is no, whether there is a first stranger image matching the first image.

The assignment element 43 is further configured to assign, when the judgment result of the second judgment element 44 is yes, a corresponding usage permission of the target application to the current first user according to a stored collection count corresponding to the first stranger image and a usage permission corresponding to a preset collection count range threshold, and not assign, when the judgment result of the second judgment element 44 is no, the usage permission of the target application to the current first user.

As shown in FIG. 4, the device further includes a third judgment element 45.

The third judgment element 45 is configured to judge whether a mobile terminal is unlocked successfully, and trigger, if the judgment result of the third judgment element 45 is yes, the collection element 41.

Figure 5:
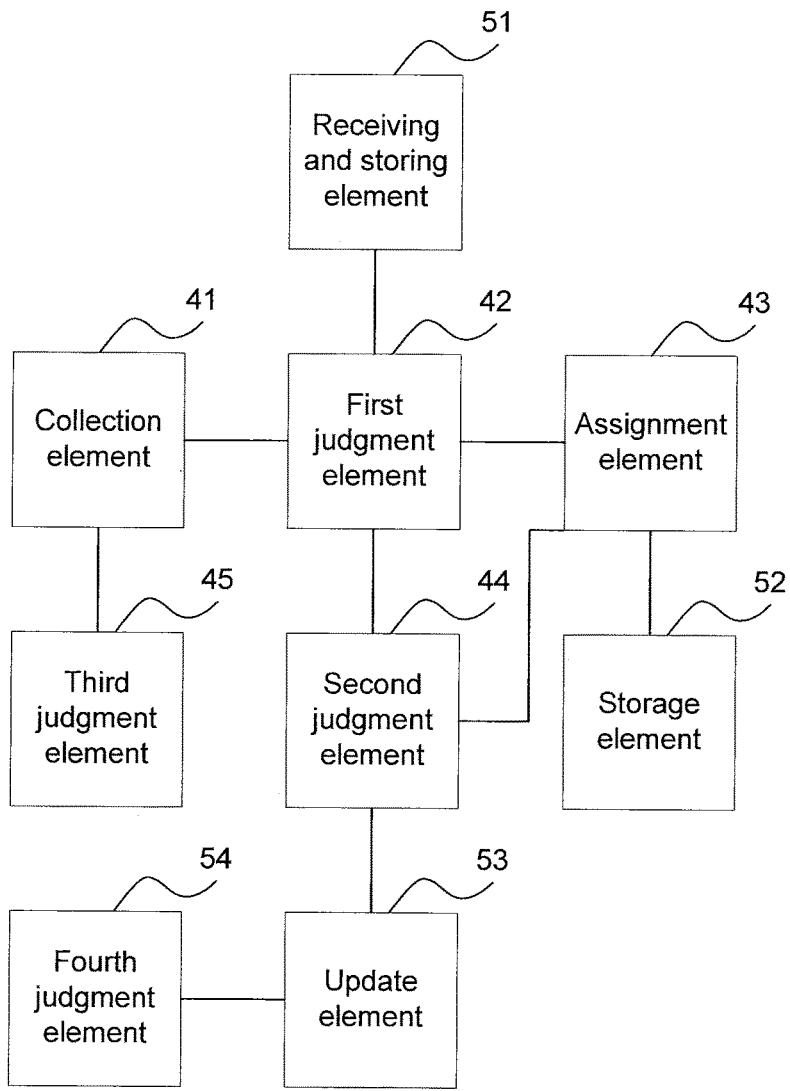
FIG. 5 is a schematic diagram of a device for assigning application usage permission according to some embodiments of the present disclosure.

FIG. 5 is a schematic diagram of a device for assigning application usage permission according to some embodiments of the present disclosure. On the basis of FIG. 4, the device further includes a receiving and storing element 51.

The receiving and storing element 51 is configured to receive an image entry request for the target application, collect a second image of a current second user, judge whether the target image corresponding to the target application is stored, if not, store the second image as the target image corresponding to the target application, if yes, judge whether a collected second image matches the stored target image corresponding to the target application, if yes, update the target image according to the collected second image, and if not, output prompt information having stored the target image corresponding to the target application.

The assignment element 43 is configured to judge whether the collection count is less than a preset first collection count threshold, if yes, not assign a usage permission of the target application to the current first user, if not, judge whether the collection count is greater than a preset second collection count threshold, if yes, assign a first partial usage permission of the target application to the current first user, and if not, assign a second partial usage permission of the target application to the current first user, wherein the first partial usage permission includes the second partial usage permission, and the first collection count threshold is less than the second collection count threshold.

The device further includes a storage element 52.

The storage element 52 is configured to store, when the judgment result of the second judgment element 44 is no, the first image as a second stranger image, and store a collection count of the second stranger image.

The device further includes an update element 53.

The update element 53 is configured to update, when the judgment result of the second judgment element 44 is yes, a collection count of the stored first stranger image.

The device further includes a fourth judgment element 54.

The fourth judgment element 54 is configured to judge whether a time interval between a first time for currently collecting the first image and a second time stored for the first stranger image is greater than a preset time threshold, trigger the update element 53 if the judgment result of the fourth judgment element 54 is yes, and update the second time according to a current time, wherein the second time is time for previously updating the collection count of the first stranger image.

The embodiments of the present disclosure disclose a method and device for assigning application usage permission. The method includes: a first image of a current first user is collected, and when it is recognized that a target application is enabled, it is judged whether the collected first image matches a pre-stored target image corresponding to the target application; if yes, all usage permissions of the target application are assigned to the first user; and if not, it is judged whether there is a first stranger image matching the first image successfully, if yes, a corresponding usage permission of the target application is assigned to the first user according to a stored collection count corresponding to the first stranger image and a usage permission corresponding to a preset collection count range threshold, and if not, the usage permission of the target application is not assigned to the first user. In the embodiments of the present disclosure, when the collected first image matches the target image corresponding to the target application successfully, all usage permissions of the target application are assigned to the first user, otherwise, a corresponding usage permission of the target application is assigned to the first user according to whether there is a first stranger image matching the first image successfully and according to a collection count corresponding to the first stranger image and a usage permission corresponding to a preset collection count range threshold, or the usage permission of the target application is not assigned to the first user. Therefore, the effect of assigning different usage permissions of the target application to different users is achieved, the leakage of the privacy of a primary user is avoided, and the use experience of the primary user is improved.

Some embodiments of the present disclosure discloses a storage medium, which includes a stored program, wherein when the program is running, a device where the storage medium is located may be controlled to perform the above method for assigning application usage permission.

For the system/device embodiments, since it is basically similar to the method embodiments, the description is relatively simple, and the relevant parts can be referred to the description of the method embodiments.

It is also to be noted that relational terms such as first and second are used merely to distinguish one entity or operation from another entity or operation, and do not necessarily require or imply the existence of any such actual relationship or order between these entities or operations.

A person skilled in the art should understand that the embodiments of the present disclosure may be provided as a method, a system or a computer program product. Thus, the present disclosure may adopt forms of complete hardware embodiments, complete application embodiments or embodiments integrating applications and hardware. Moreover, the present disclosure may adopt the form of a computer program product implemented on one or more computer available storage media (including, but not limited to, a disk memory, a CD-ROM, an optical memory and the like) containing computer available program codes.

The present disclosure is described with reference to flowcharts and/or block diagrams of the method, the device (system) and the computer program product according to the embodiments of the present disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an device for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction device is generated via the instructions stored in the computer readable memory, and the instruction device achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

While some embodiments of the present disclosure have been described, those skilled in the art can make additional changes and modifications to the embodiments once knowing a basic creativity concept. Therefore, the appended claims are intended to be interpreted as including some embodiments and all the changes and modifications falling within the scope of the present disclosure.

It is apparent that those skilled in the art can make various modifications and variations to the present disclosure without departing from the spirit and scope of the present disclosure. Thus, if such modifications and variations of the present disclosure fall within the scope of the appended claims and their equivalents, the present disclosure is also intended to cover the modifications and variations.

What is claimed is:

1. A method for assigning application usage permission, comprising:

collecting a first image of a current first user, and when it is recognized that a target application is enabled, judging whether the collected first image matches a pre-stored target image corresponding to the target application;

if the collected first image matches the pre-stored target image corresponding to the target application, assigning all usage permissions of the target application to the current first user; and if the collected first image does not match the pre-stored target image corresponding to the target application, judging whether there is a first stranger image matching the first image successfully, if there is a first stranger image matching the first image successfully, assigning a corresponding usage permission of the target application to the current first user according to a stored collection count corresponding to the first stranger image and a usage permission corresponding to a preset collection count range threshold, and if there is not a first stranger image matching the first image successfully, not assigning the usage permission of the target application to the current first user;

wherein if it is determined that there is a first stranger image matching the first image successfully, the method further comprises:

updating the collection count of the stored first stranger image, wherein every time an image matching the stranger image is collected, the collection count of the first stranger image is increased by a preset count.

2. The method according to claim 1, wherein before collecting the first image of the current first user, the method further comprises:

judging whether a mobile terminal is unlocked successfully, and if the mobile terminal is unlocked successfully, collecting the first image of the current first user, and when it is recognized that the target application is enabled, judging whether the collected first image matches the pre-stored target image corresponding to the target application.

3. The method according to claim 2, wherein if it is determined that there is not a first stranger image matching the first image successfully, the method further comprises:

storing the first image as a second stranger image, and storing a collection count of the second stranger image.

4. The method according to claim 1, further comprising:

receiving an image entry request for the target application;

collecting a second image of a current second user, and judging whether the target image corresponding to the target application is stored;

if the target image corresponding to the target application is not stored, storing the second image as the target image corresponding to the target application; and if the target image corresponding to the target application is stored, judging whether a collected second image matches the stored target image corresponding to the target application, if the collected second image does not match the stored target image corresponding to the target application, updating the target image according to the collected second image, and if the collected second image matches the stored target image corresponding to the target application, outputting prompt information having stored the target image corresponding to the target application.

5. The method according to claim 4, wherein if it is determined that there is not a first stranger image matching the first image successfully, the method further comprises:

storing the first image as a second stranger image, and storing a collection count of the second stranger image.

6. The method according to claim 1, wherein assigning the corresponding usage permission of the target application to the current first user according to the collection count corresponding to the first stranger image and the usage permission corresponding to the collection count range threshold comprises:

judging whether the collection count is less than a preset first collection count threshold;

if the collection count is less than the preset first collection count threshold, not assigning the usage permission of the target application to the current first user; and if the collection count is not less than the preset first collection count threshold, judging whether the collection count is greater than a preset second collection count threshold, if the collection count is greater than the preset second collection count threshold, assigning a first partial usage permission of the target application to the current first user, and if the collection count is not greater than the preset second collection count threshold, assigning a second partial usage permission of the target application to the current first user, wherein the first partial usage permission comprises the second partial usage permission, and the preset first collection count threshold is less than the preset second collection count threshold.

7. The method according to claim 6, wherein if it is determined that there is not a first stranger image matching the first image successfully, the method further comprises:

storing the first image as a second stranger image, and storing a collection count of the second stranger image.

8. The method according to claim 1, wherein if it is determined that there is not a first stranger image matching the first image successfully, the method further comprises:

storing the first image as a second stranger image, and storing a collection count of the second stranger image.

9. The method according to claim 1, wherein before updating the collection count of the stored first stranger image, the method further comprises:

determining a time interval between a first time for currently collecting the first image and a second time stored for the first stranger image;

judging whether the time interval is greater than a preset time threshold, if the time interval is greater than the preset time threshold, updating the collection count of the stored first stranger image, and updating the second time according to a current time, wherein the second time is time for previously updating the collection count of the first stranger image.

10. A non-transitory computer readable storage medium, comprising a stored program, wherein a device where the non-transitory computer readable storage medium is located is controlled by running the stored program to perform the method for assigning application usage permission according to claim 1.

11. A device for assigning application usage permission, comprises a hardware processor configured to execute program modules stored on a memory, the program modules comprising:

a collection element, configured to collect a first image of a current first user;

a first judgment element, configured to judge, when it is recognized that a target application is enabled, whether the collected first image matches a pre-stored target image corresponding to the target application;

an assignment element, configured to assign, when a judgment result of the first judgment element is yes, all usage permissions of the target application to the current first user; and a second judgment element, configured to judge, when the judgment result of the first judgment element is no, whether there is a first stranger image matching the first image, wherein the assignment element is further configured to assign, when the judgment result of the second judgment element is yes, a corresponding usage permission of the target application to the current first user according to a stored collection count corresponding to the first stranger image and a usage permission corresponding to a preset collection count range threshold, and not assign, when the judgment result of the second judgment element is no, the usage permission of the target application to the current first user;

an update element, configured to update, when the judgment result of the second judgment element is yes, the collection count of the stored first stranger image, wherein every time an image matching the first stranger image is collected, the collection count of the first stranger image is increased by a preset count.

12. The device according to claim 11, further comprising:
a third judgment element, configured to judge whether a mobile terminal is unlocked successfully, and trigger, if the judgment result of the third judgment element is yes, the collection element.

13. The device according to claim 11, further comprising:
a receiving and storing element, configured to receive an image entry request for the target application, collect a second image of a current second user, judge whether the target image corresponding to the target application is stored, if the target image corresponding to the target application is not stored, store the second image as the target image corresponding to the target application, if the target image corresponding to the target application is stored, judge whether a collected second image matches the stored target image corresponding to the target application, if the collected second image does not match the stored target image corresponding to the target application, update the target image according to the collected second image, and if the collected second image matches the stored target image corresponding to the target application, output prompt information having stored the target image corresponding to the target application.

14. The device according to claim 11, wherein the assignment element is configured to judge whether the collection count is less than a preset first collection count threshold, if the collection count is less than the preset first collection count threshold, not assign a usage permission of the target application to the current first user, if the collection count is not less than the preset first collection count threshold, judge whether the collection count is greater than a preset second collection count threshold, if the collection count is greater than the preset second collection count threshold, assign a first partial usage permission of the target application to the current first user, and if the collection count is not greater than the preset second collection count threshold, assign a second partial usage permission of the target application to the current first user, wherein the first partial usage permission comprises the second partial usage permission, and the preset first collection count threshold is less than the preset second collection count threshold.

15. The device according to claim 11, further comprising:
a storage element, configured to store, when the judgment result of the second judgment element is no, the first image as a second stranger image, and store a collection count of the second stranger image.

16. The device according to claim 11, further comprising:
a fourth judgment element, configured to determine a time interval between a first time for currently collecting the first image and a second time stored for the first stranger image, judge whether the time interval is greater than a preset time threshold, trigger the update element if the judgment result of the fourth judgment element is yes, and update the second time according to a current time, wherein the second time is time for previously updating the collection count of the first stranger image.

\* \* \* \* \*